United States Patent
Kim

(10) Patent No.: US 11,956,195 B2
(45) Date of Patent: Apr. 9, 2024

(54) METHOD, COMPUTER DEVICE, AND NON-TRANSITORY COMPUTER-READABLE RECORDING MEDIUM TO DIFFERENTIALLY LIMIT MESSAGE TRANSMISSION IN MESSAGING-BASED SOCIAL NETWORK SERVICE

(71) Applicant: LINE Plus Corporation, Seongnam-si (KR)

(72) Inventor: Julie Kim, Seongnam-si (KR)

(73) Assignee: LINE PLUS CORPORATION, Gyeonggi-do (KR)

(*) Notice: Subject to any disclaimer, the term of this patent is extended or adjusted under 35 U.S.C. 154(b) by 0 days.

(21) Appl. No.: 17/845,254

(22) Filed: Jun. 21, 2022

(65) Prior Publication Data
US 2022/0417193 A1 Dec. 29, 2022

(30) Foreign Application Priority Data
Jun. 23, 2021 (KR) .................. 10-2021-0081294

(51) Int. Cl.
*H04L 51/212* (2022.01)
*H04L 51/216* (2022.01)
*H04L 51/224* (2022.01)

(52) U.S. Cl.
CPC .......... *H04L 51/212* (2022.05); *H04L 51/216* (2022.05); *H04L 51/224* (2022.05)

(58) Field of Classification Search
None
See application file for complete search history.

(56) References Cited

U.S. PATENT DOCUMENTS

| 7,143,135 B2* | 11/2006 | Smith | H04L 9/40 709/204 |
| 2015/0154291 A1* | 6/2015 | Shepherd | H04L 67/535 707/748 |
| 2016/0148156 A1* | 5/2016 | Gaucher | G06Q 10/10 707/736 |
| 2016/0182576 A1* | 6/2016 | Kromnick | H04L 67/12 709/204 |
| 2017/0249671 A1* | 8/2017 | Dinh | G06Q 30/0643 |

(Continued)

FOREIGN PATENT DOCUMENTS

| KR | 10-2002-0034328 A | 5/2002 |
| KR | 10-2002-0074304 A | 9/2002 |

(Continued)

OTHER PUBLICATIONS

Korean Office Action dated Feb. 16, 2023 issued in Korean Patent Application No. 10-2021-0081294.

*Primary Examiner* — Chris Parry
*Assistant Examiner* — Abderrahmen Chouat
(74) *Attorney, Agent, or Firm* — Harness, Dickey & Pierce, P.L.C.

(57) ABSTRACT

Disclosed are methods, computer devices, and a non-transitory computer-readable recording mediums to differentially limit a message transmission in a messaging-based social network service. A message transmission limiting method may include calculating a participation score according to an activity related to a user in a chatroom, setting a speech time limit for the user based on the participation score, and limiting a message transmission of the user through the chatroom according to the speech time limit.

19 Claims, 11 Drawing Sheets

(56) References Cited

U.S. PATENT DOCUMENTS

| | | | | |
|---|---|---|---|---|
| 2020/0233915 A1* | 7/2020 | Anders | ............... | G06F 16/345 |
| 2021/0176429 A1* | 6/2021 | Peters | ................ | G06V 20/41 |
| 2022/0246145 A1* | 8/2022 | Lum | ................ | H04L 12/1827 |
| 2023/0013341 A1* | 1/2023 | Mao | ................ | H04M 3/566 |

FOREIGN PATENT DOCUMENTS

| | | |
|---|---|---|
| KR | 10-2008-0037262 A | 4/2008 |
| KR | 10-2018-0015477 A | 2/2018 |

* cited by examiner

METHOD, COMPUTER DEVICE, AND NON-TRANSITORY COMPUTER-READABLE RECORDING MEDIUM TO DIFFERENTIALLY LIMIT MESSAGE TRANSMISSION IN MESSAGING-BASED SOCIAL NETWORK SERVICE

CROSS-REFERENCE TO RELATED APPLICATION(S)

This U.S. non-provisional application and claims the benefit of priority under 35 U.S.C. § 119 to Korean Patent Application No. 10-2021-0081294, filed Jun. 23, 2021, the entire contents of which are incorporated herein by reference in their entirety.

BACKGROUND

Technical Field

Some example embodiments relate to technology for providing a messaging-based social network service.

Related Art

An instant messenger that is a general communication tool refers to software capable of transmitting and receiving messages or data in real time. A user may register a contact on a messenger and may send and receive messages with a counterpart on a contact list in real time.

Due to such a messenger function, the messenger is commonly used in a mobile environment of a mobile communication terminal as well as a personal computer (PC).

For example, a mobile messenger service system and method of a portable terminal using a wireless communication network may provide a messenger service between mobile messengers installed on mobile terminals.

As the use of an instant messenger becomes more popular and functions provided through the instant messenger become more diversified, an openchat function that enables a chat in a non-acquaintance-based environment using a link without sharing personal information, such as a telephone number and an ID, is being serviced.

SUMMARY

Some example embodiments may differentially limit a right to speak between members participating in a chatroom in a messaging-based social network service.

Some example embodiments may differently set a speech time limit of each member based on a level of participation in a chatroom.

Some example embodiments may automatically activate a speech limiting function of a corresponding chatroom according to a load amount of the chatroom.

Some example embodiments may differentially apply a speech limit range for each chatroom based on a load amount of a corresponding chatroom.

According to an aspect of at least one example embodiment, a message transmission limiting method performed by a computer device including at least one processor configured to execute computer-readable instructions included in a memory may include, by the at least one processor, calculating a participation score according to an activity related to a user in a chatroom, setting a speech time limit for the user based on the participation score, and limiting a message transmission of the user through the chatroom according to the speech time limit.

The calculating may include calculating the participation score based on at least one of message transmission information of the user and response information from other users to the user or a message transmitted from the user in the chatroom.

The calculating may include counting a number of message transmissions of the user in the chatroom, counting a number of responses to a message transmitted from the user, the responses including at least one of a mention for the user and a reply, a comment, a reaction, capturing, keeping, and sharing, and calculating the participation score based on the number of message transmissions and the number of responses.

The setting may include setting the speech time limit to decrease according to an increase in the participation score.

The setting may include setting the speech time limit of a level corresponding to the participation score of the user among the plurality of levels corresponding to participation scores or a plurality of participation score ranges, respectively.

The limiting may include controlling the message transmission according to a time interval corresponding to the speech time limit.

The limiting may include maintaining a state in which the message transmission is disallowed during the speech time limit after transmitting a previous message, and switching to a state in which the message transmission is allowed when the speech time limit elapses.

The message transmission limiting method may further include, by the at least one processor, checking a load amount of the chatroom, and activating a speech limiting function that limits the message transmission through the chatroom based on the load amount.

The checking may include checking the load amount based on at least one of a number of members participating in the chatroom and a number of messages processible per unit time.

The activating may include automatically turning ON the speech limiting function when the load amount reaches a threshold.

The activating may include differently setting a time range settable as the speech time limit in the chatroom according to the load amount.

According to an aspect of at least one example embodiment, there is provided a non-transitory computer-readable recording medium storing instructions that, when executed by a processor, cause a computer device to perform the message transmission limiting method.

According to an aspect of at least one example embodiment, a computer device may include at least one processor configured to execute computer-readable instructions included in a memory. The at least one processor may be configured to cause the computer device to calculate a participation score according to an activity related to a user in a chatroom, set a speech time limit for the user based on the participation score, and limit a message transmission of the user through the chatroom according to the speech time limit.

Further areas of applicability will become apparent from the description provided herein. The description and specific examples in this summary are intended for purposes of illustration only and are not intended to limit the scope of the present disclosure.

DETAILED DESCRIPTION

Figure 1:
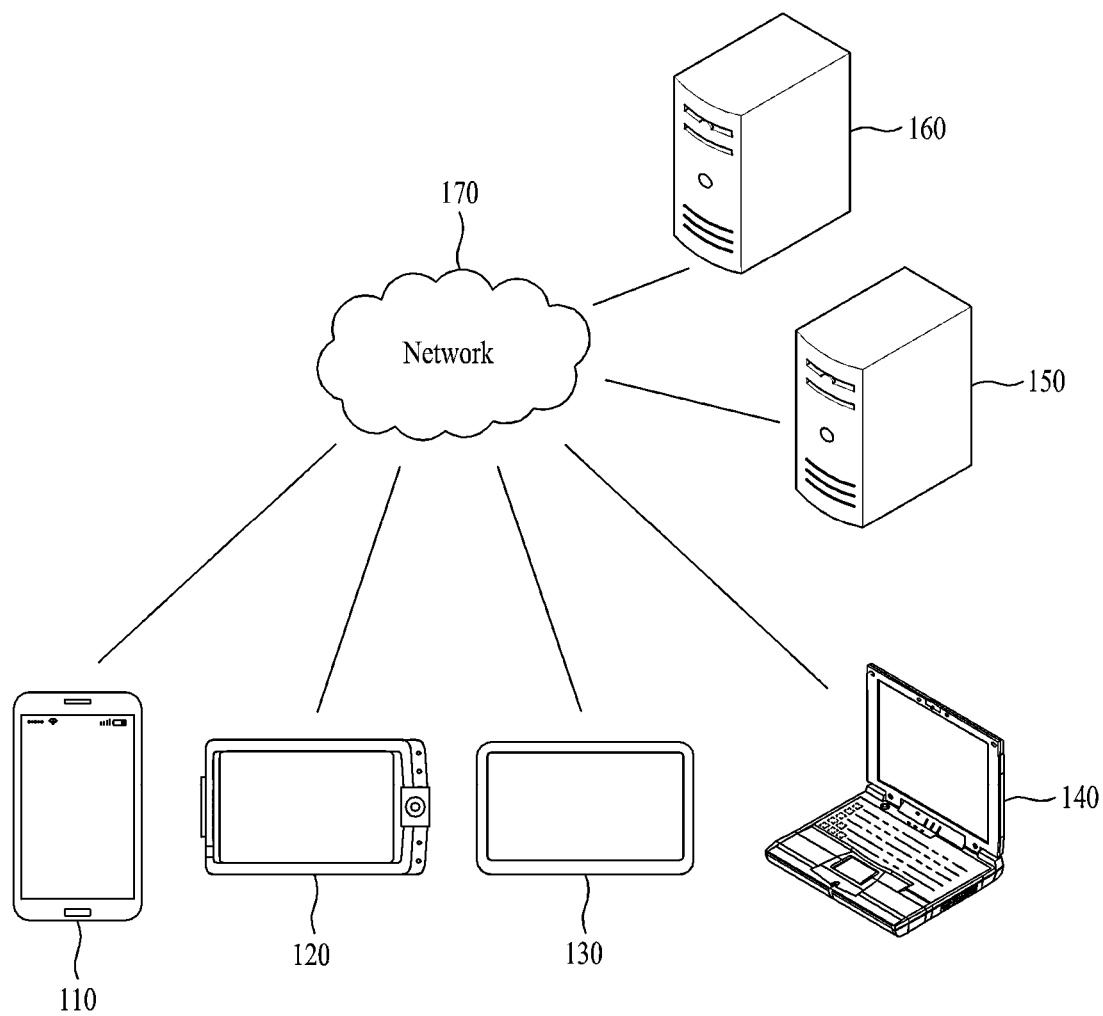
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a messaging-based social network service.

Some example embodiments disclosed herein may differentially limit a right to speak based on a level of participation between members participating in a chatroom in the messaging-based social network service.

The chatroom used herein may encompass a community space provided from the messaging-based social network service, such as a messenger and a social network service (SNS). In the example embodiment, the chatroom may refer to a community space that allows a user to participate in a conversation on the premise of joining, for example, an openchat that allows an immediate chat using a link, such as a uniform resource locator (URL), without a friend addition process using a telephone number and an ID, a chatroom with an official account that represents an account in a form of a bot providing various types of services or contents.

Also, a speech used herein may refer to transmitting a message in a chatroom.

A message transmission limiting system according to some example embodiments may be implemented by at least one computer device. A message transmission limiting method according to some example embodiments may be performed by at least one computer device included in the message transmission limiting system. Here, a computer program stored in a non-transitory computer-readable record medium according to an example embodiment may be installed and run on the computer device and the computer device may perform the message transmission limiting method according to example embodiments under control of the computer program. The aforementioned computer program may be stored in a computer-readable recording medium to implement the message transmission limiting method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a messaging-based social network service, to the plurality of electronic devices 110, 120, 130, and 140 connected over the network 170.

Figure 2:
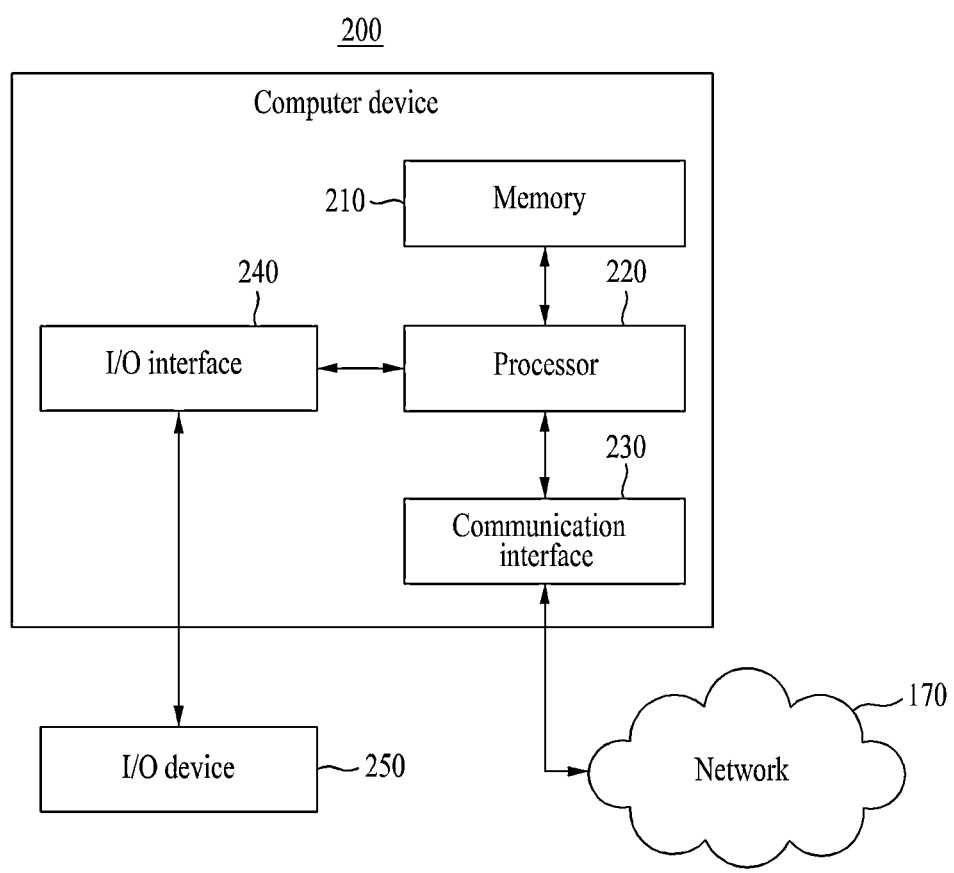
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. The permanent mass storage device, such as ROM and disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to specifically and clearly illustrate those conventional components. For example, the computer device 200 may be configured to include at least a portion of the I/O device 250 or may further include other components, such as a transceiver and a database.

Hereinafter, a method and system for differentially limiting a message transmission in a messaging-based social network service according to some example embodiments will be described.

Figure 3:
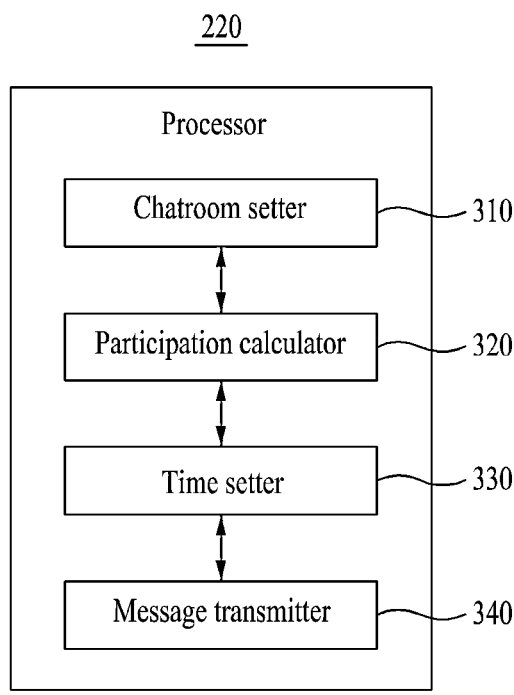
FIG. 3 illustrates an example of a component includable in a processor of a computer device according to at least one example embodiment.
Figure 4:
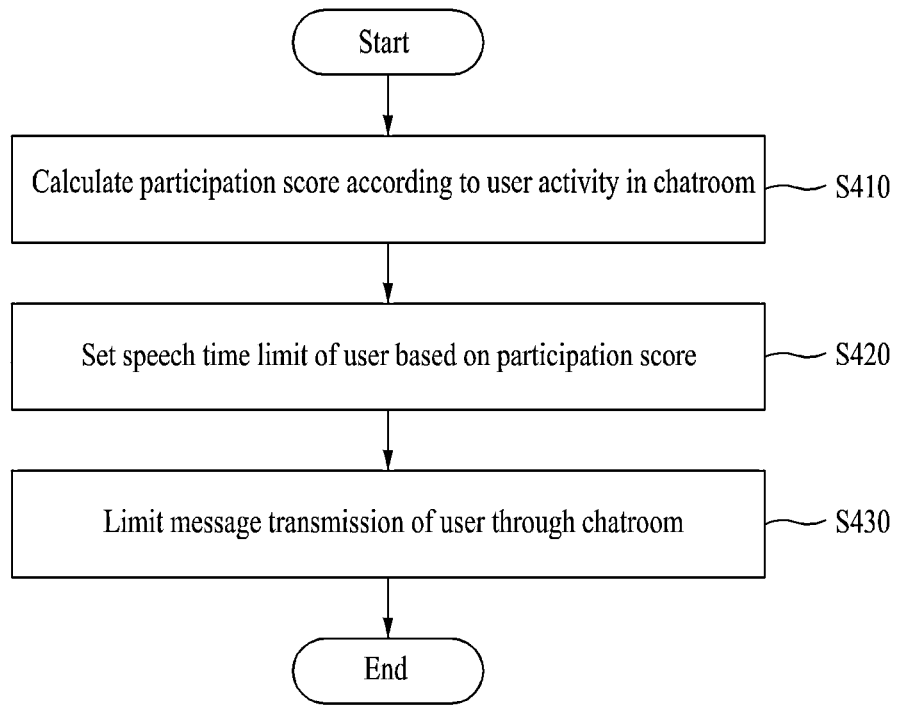
FIG. 4 is a flowchart illustrating an example of a method performed by a computer device according to at least one example embodiment.

FIG. 3 is a diagram illustrating an example of a component includable in a processor of a computer device according to at least one example embodiment, and FIG. 4 is a flowchart illustrating an example of a message transmission limiting method performed by a computer device according to at least one example embodiment.

The computer device 200 according to the example embodiment may provide a messenger service through connection to an exclusive application or a website/mobile site. A message transmission limiting system implemented as a computer may be configured in the computer device 200. For example, the message transmission limiting system may be implemented in a form of a program that independently operates or may be configured in an in-app form of a specific application to be operable on the specific application.

Referring to FIG. 3, the processor 220 of the computer device 200 may include a chatroom setter 310, a participation calculator 320, a time setter 330, and a message transmitter 340 as components to perform the following message transmission limiting method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following message transmission limiting method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200. For example, the chatroom setter 310 may be used as a functional representation of the processor 220 that controls the computer device 200 to set a speech limiting function of a chatroom in response to the instruction.

The processor 220 may read a desired instruction from which instructions related to control of the computer device 200 are loaded. In this case, the read instruction may include an instruction for controlling the processor 220 to perform the following message transmission limiting method.

Operations included in the following message transmission limiting method may be performed in order different from illustrated order. A portion of the operations may be omitted or an additional process may be further included.

Operations included in the message transmission limiting method may be performed by a client on which a messenger is installed. Depending on example embodiments, a portion of operations may be performed by the server 150.

Referring to FIG. 4, in operation S410, the participation score calculator 320 may calculate a participation score according to an activity related to a specific user in a chatroom. The participation score calculator 320 may calculate a participation score of a user by scoring a user-related activity performed in the chatroom for a unit time at an interval of the unit time (e.g., 12 hours, 6 hours, etc.). When operation S410 is performed by a client, the participation score calculator 320 may calculate a participation score by checking only a user activity on a client side. When operation S410 is performed by the server 150, the participation score calculator 320 may calculate a participation score according to each user activity for all of users participating as members in the chatroom.

Figure 5:
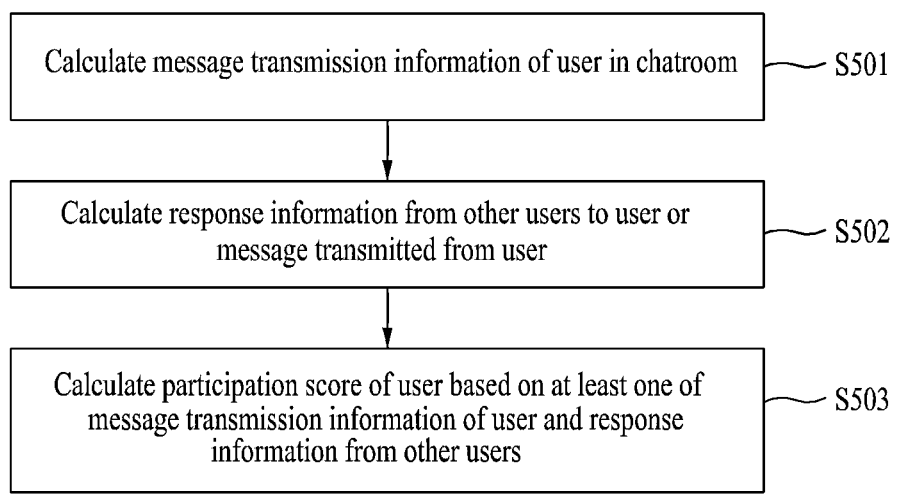
FIG. 5 is a flowchart illustrating an example of a process of calculating a user participation score according to at least one example embodiment.

FIG. 5 is a flowchart illustrating an example of a process of calculating a user participation score according to at least one example embodiment.

Referring to FIG. 5, in operation S501, the participation score calculator 320 may calculate message transmission information of each user in the chatroom. For example, the participation score calculator 320 may count a number of speeches, that is, a number of message transmissions made by each user in the chatroom during a recent unit time.

In operation S502, the participation score calculator 320 may calculate response information from other users to the user or a message transmitted from the user. For example, the participation score calculator 320 may count a number of responses from other users to the user performed through the chatroom during the recent unit time. Here, a response in the chatroom may include a behavior of leaving a reply or a comment to the message transmitted from the user, a behavior of leaving a positive reaction, such as "like," to the message transmitted from the user, a behavior of sharing the message transmitted from the user, a behavior of capturing or keeping the message transmitted from the user, and a behavior of transmitting a message that includes a mention for the user. The participation score calculator 320 may distinguishably count responses from other users to the user for each type of behavior.

In operation S503, the participation score calculator 320 may calculate the participation score of the user based on at least one of message transmission information of the user and response information from other users to the user or to the message transmitted from the user. The user participation score may be calculated by assigning a score set for each type of behavior. For example, +5 points may be assigned to a message transmission, +3 point may be assigned to a reply or a comment, +3 points may be assigned to a positive reaction, +3 points may be assigned to share and keep, and +5 points may be assigned to a mention. The participation score calculator 320 may calculate the participation score of the user by calculating a score according to message transmission information of the user and a score according to responses from other users and by summing the score according to the message transmission information of the user and the score according to the responses from the other users.

A user that transmits a useful message in the chatroom may be selected based on at least one of message transmission information and response information from the others. By determining that a user corresponding to a larger number of message transmissions and a larger number of responses from other users is highly likely to be a user that transmits a useful message, a higher participation score may be assigned to the user that transmits the useful message rather than a user that does not.

When calculating the user participation score, one of the message transmission information of the user (e.g., the number of message transmissions) and the response information from the other users (e.g., the number of responses from the other users) may be used. In some example embodiments, another activity index may be additionally used.

Therefore, the participation score calculator 320 may check a user-related activity performed in the chatroom at an interval of a unit time and may periodically calculate a participation score that represents a user activity in the chatroom.

Referring again to FIG. 4, in operation S420, the time setter 330 may set a speech time limit of the user based on the participation score according to the activity in the chatroom. The time setter 330 may set the speech time limit in inverse proportion to the participation score of the user. The time setter 330 may determine that a user corresponding to a larger number of message transmissions and/or a user corresponding to responses from other users is highly likely to be a user that transmits a useful message and may set a speech time limit of the user to be shorter than those of other users such that the user may more frequently make a speech. For example, the time setter 330 may set the speech time limit through a linear calculation that is inversely proportional to the participation score. As another example, the time setter 330 may predefine the speech time limit for a plurality of levels corresponding to participation scores or a plurality of participation score ranges, respectively, and may set a speech time limit of a level corresponding to the participation score of the user.

In operation S430, the message transmitter 340 may limit a message transmission of the user through the chatroom according to the speech time limit set in operation S420. The message transmitter 340 relates to applying a time interval to a message transmission in the chatroom and may control a subsequent message transmission according to a time interval set as the speech time limit. That is, the message transmitter 340 may maintain an inactive state in which the message transmission is disallowed during the speech time limit after transmitting a previous message and may switch to a state in which a subsequent message transmission is allowed when the speech time limit elapses. The message transmitter 340 may grant a right to more frequently transmit messages at short time intervals when the user participation is high due to an aggressive activity in the chatroom and, on the contrary, may limit a right to speak by applying a relatively long message transmission time interval when the user participation decreases.

Therefore, the example embodiment may differentially control a message transmission according to a user participation in a chatroom.

Figure 6:
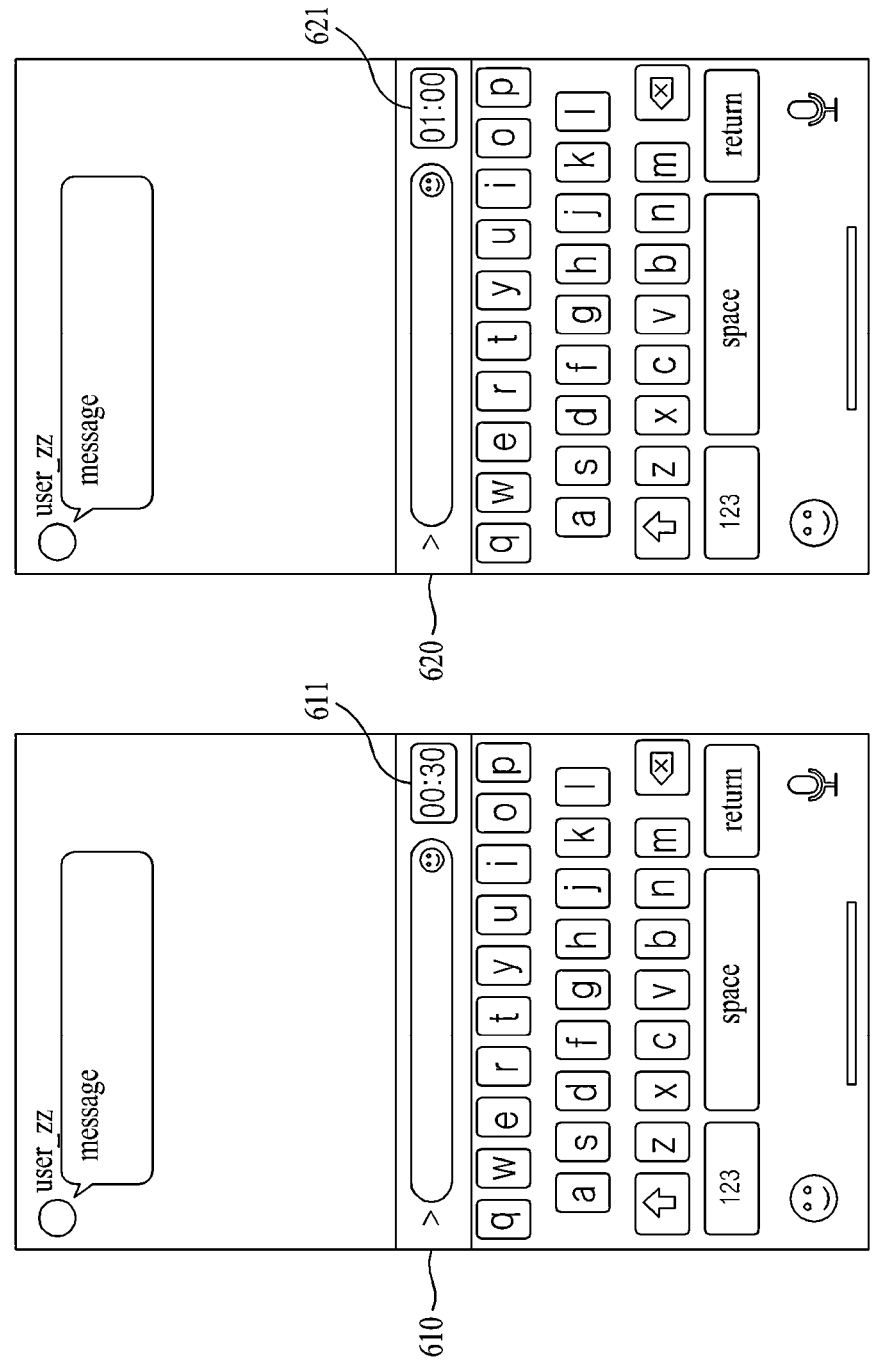
FIGS. 6 and 7 illustrate examples of a chatroom screen for limiting a message transmission according to at least one example embodiment.
Figure 7:
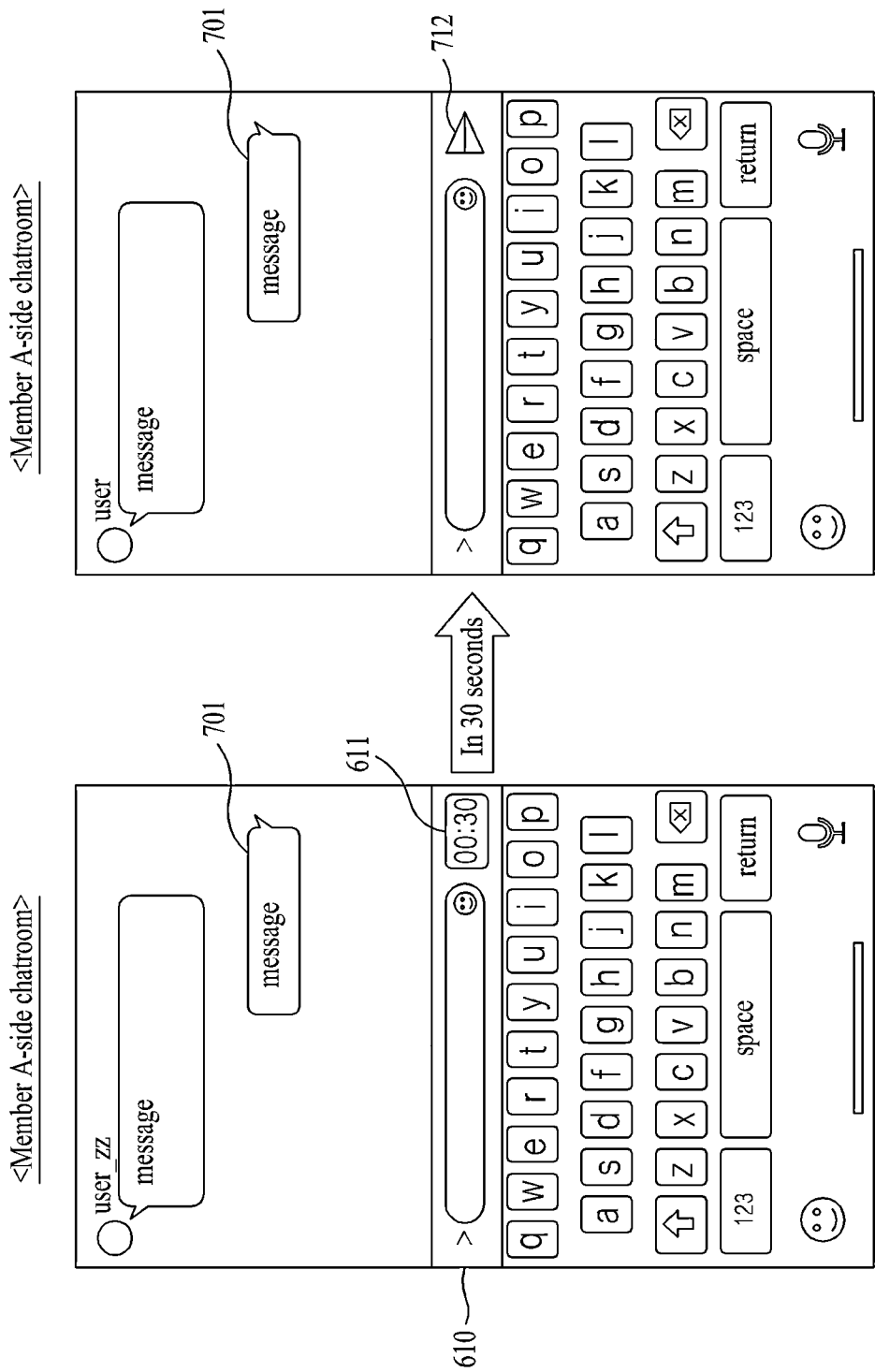

FIGS. 6 and 7 illustrate examples of a chatroom screen for limiting a message transmission according to at least one example embodiment.

FIG. 6 illustrates differential speech limiting functions of member A and member B participating in the same chatroom.

When member A has a higher level of participation in the chatroom rather than member B, 30 seconds may be applied as a speech time limit of member A and 1 minute may be applied as a speech time limit of member B according to a level of participation of each member. Member A may transmit a message every 30 seconds and member B may transmit a message every 1 minute.

Referring to FIG. 6, a speech time limit 611 set according to a level of participation of member A may be displayed on a message input window 610 on a member A-side chatroom screen. A speech time limit 621 set according to a level of participation of member B may be displayed on a message input window 620 on a member B-side chatroom screen.

The speech time limits 611 and 621 of the respective members participating in the chatroom may be differently applied according to levels of participation of the corresponding members in the chatroom.

The speech time limits 611 and 621 may be displayed in a countdown form. Until the count reaches zero, a message creation through the message input windows 610 and 620 may be disallowed or transmission of messages input to the message input windows 610 and 620 may be disallowed.

Referring to FIG. 7, when member A transmits a message 701 in the chatroom, the processor 220 may limit a subsequent message transmission during the speech time limit 611. Immediately after the message 701 corresponding to a previous message is transmitted, it may switch to a state in which a message creation and a message transmission is disallowed and the speech time limit 611 may be displayed on the message input window 610 and, at the same time, a real-time countdown may be provided. When the speech time limit 611 elapses, it may switch to a state in which the message transmission is allowed and a send button 712 is activated on the message input window 610 and member A may transmit a subsequent message accordingly.

Therefore, the processor 220 may transmit a message transmission interval of member A using the speech time limit 611 set according to a level of participation of member A in the chatroom.

A speech limiting function may be implemented in a state in which a message creation is allowed at all times and a message transmission is disallowed during the speech time limit 611 or may be implemented in a state in which the message creation and the message transmission are disallowed during the speech time limit 611. Depending on example embodiments, the speech limiting function may be implemented in a form in which a user input for the message creation and the message transmission is allowed at all times and the client or the server 150 transmits a corresponding message when the speech time limit 611 elapses while holding transmission of the message.

The speech limiting function may operate through a manual setting by a user having created the chatroom or a user having administrator authority of the chatroom. When the speech limiting function is turned ON through an environment setting in the chatroom, a speech time limit of each member participating in the corresponding chatroom may be differentially applied according to a level of participation.

Depending on example embodiments, a speech limiting function of a corresponding chatroom may be automatically activated according to a load amount of the chatroom. For example, when more than a predetermined (or, alternatively, desired) number of messages are delivered to the server 150 within a predetermined (or, alternatively, desired) period of time in a specific chatroom, the speech limiting function may be automatically activated in the corresponding chatroom. The predetermined (or, alternatively, desired) period of time and the predetermined (or, alternatively, desired) number may be determined based on a setting value or may be determined based on a threshold load amount according to a message transmission history.

Figure 8:
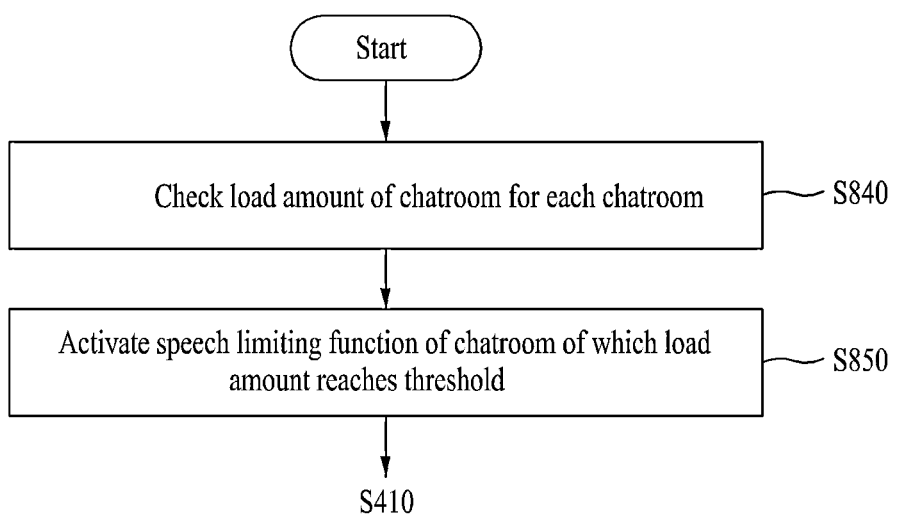
FIG. 8 is a flowchart illustrating an example of a process of automatically activating a speech limiting function according to at least one example embodiment.

FIG. 8 is a flowchart illustrating an example of a process of automatically activating a speech limiting function according to at least one example embodiment.

Operations of FIG. 8 may be performed by a client on which a messenger is installed and a portion of operations may be performed by the server 150 depending on example embodiments.

Referring to FIG. 8, in operation S840, the chatroom setter 310 may check a load amount of a chatroom for each chatroom. The chatroom setter 310 may check a load amount for each chatroom at an interval of a unit time. For example, the chatroom setter 310 may calculate a threshold load amount that affects a back-end system based on a number of members participating in the chatroom, a number messages processible per unit time, and the like.

In operation S850, the chatroom setter 310 may automatically turn ON/OFF a speech limiting function of the corresponding chatroom based on the threshold load amount of the chatroom. The chatroom setter 310 may activate a speech limiting function of a chatroom of which a load amount reaches a preset threshold (e.g., threshold load amount). As the speech limiting function is activated, the message transmission limiting method of FIGS. 4 to 7 may be performed for the corresponding chatroom.

Figure 9:
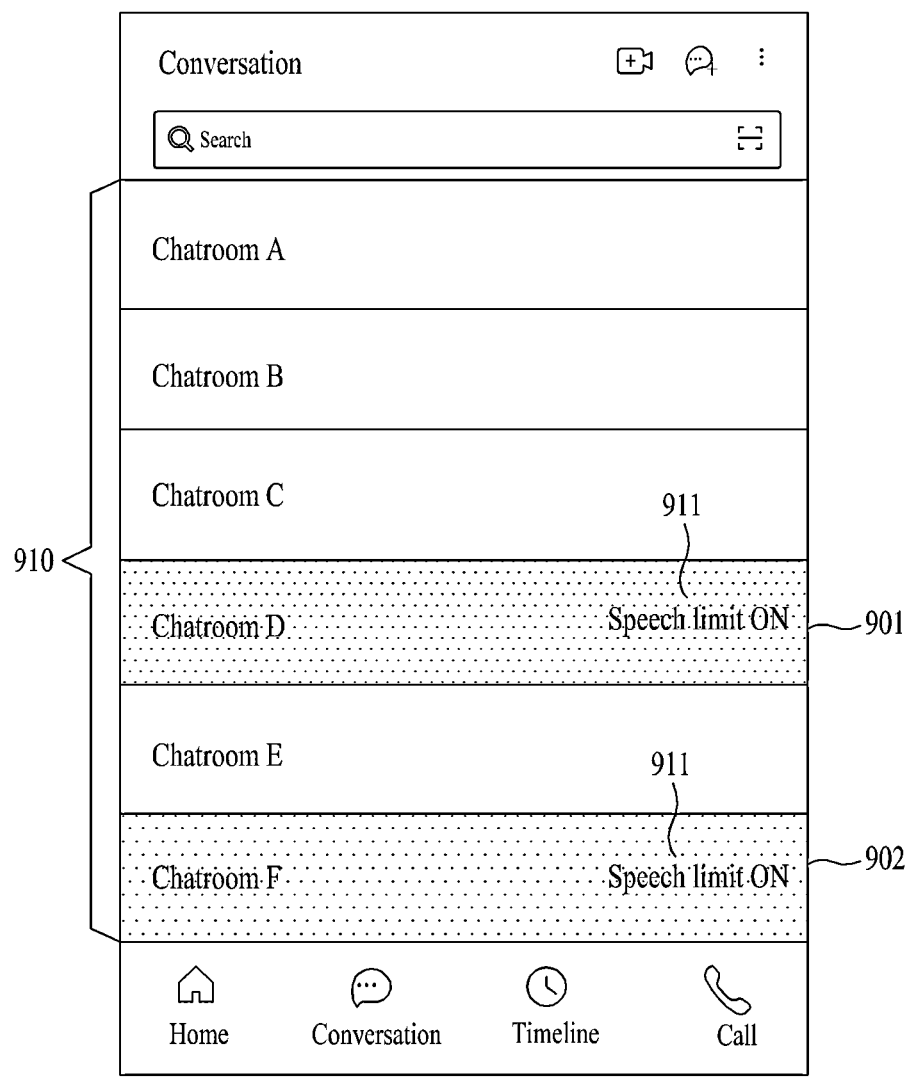
FIG. 9 illustrates an example of a screen for distinguishably displaying a chatroom in which a speech limiting function is activated in a chatroom list according to at least one example embodiment.

Referring to FIG. 9, a chatroom list screen 900 may be configured with a chatroom list 910 including all chatrooms generated in a messaging-based social network service.

The chatrooms included in the chatroom list 910 may be sorted based on message transmission/reception times of chatrooms and thereby displayed.

Here, the processor 220 may display chatrooms 901 and 902 in each of which a speech limiting function is activated to be distinguished from other chatrooms in the chatroom list 910. For example, for the chatrooms 901 and 902 in each of which the speech limiting function is activated, speech limit state information 911 may be displayed using a separate comment, an identifier, or various display elements, such as a list item color or highlight.

Further, the processor 220 may differentially apply the speech limit range for each chatroom based on a load amount of a corresponding chatroom. For example, the speech limit range may refer to a time range settable as a speech time limit.

The processor 220 may differently designate the speech limit range for each level by defining an activation threshold that is a standard for activating the speech limiting function of the chatroom using a plurality of levels.

Figure 10:
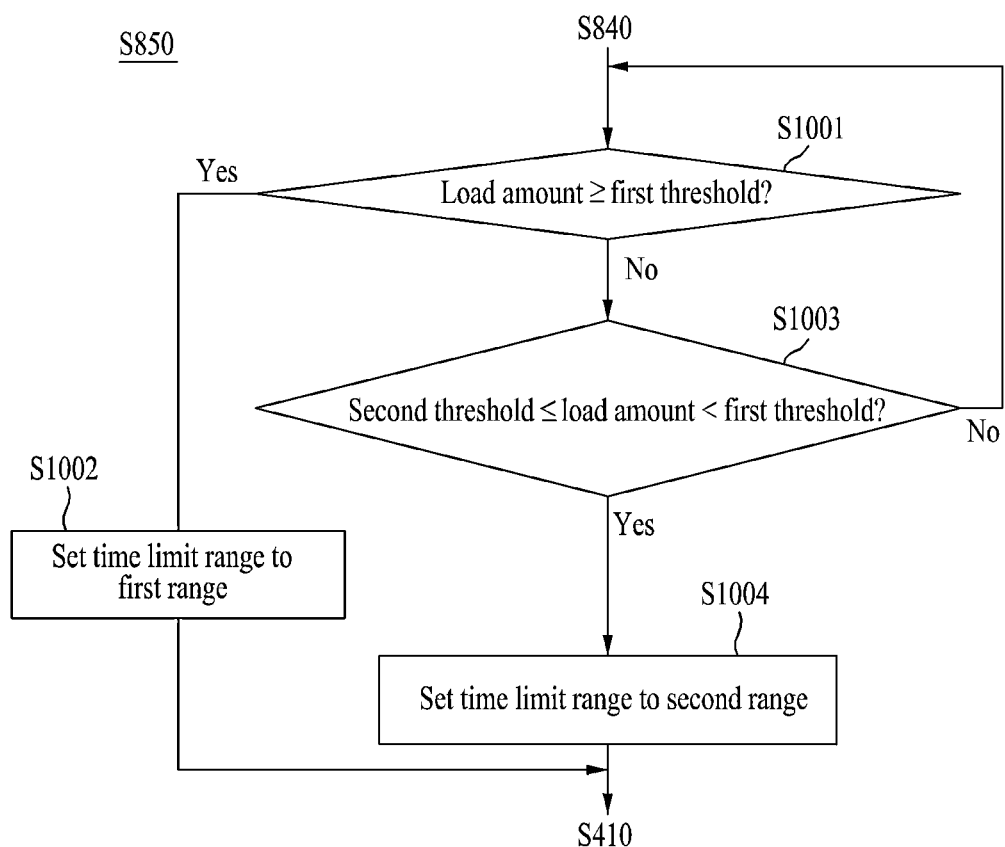
FIG. 10 is a flowchart illustrating an example of a process of differentially applying the speech limit range for each chatroom according to at least one example embodiment.

FIG. 10 is a flowchart illustrating another example of a process of differentially applying the speech limit range for each chatroom according to at least one example embodiment. The process of FIG. 10 may be included in operation S850 of activating the speech limiting function of FIG. 8.

For example, referring to FIG. 10, the speech limit range may be classified into two levels and thereby applied.

In operation S1001, the processor 220 may determine whether a load amount of the chatroom is greater than or equal to a first threshold.

In operation S1002, when the load amount of the chatroom is greater than or equal to the first threshold, the processor 220 may activate the speech limiting function and, at the same time, set a speech time limit range applicable in the chatroom to a first range.

In a chatroom in which load amount is greater than or equal to the first threshold, a speech time limit of each member may be determined within the first range based on a level of participation.

In operation S1003, when the load amount of the chatroom is less than the first threshold, the processor 220 may determine whether the load amount of the chatroom is greater than or equal to a second threshold, which is less than the first threshold.

In operation S1004, when the load amount of the chatroom is greater than or equal to the second threshold and less than the first threshold, the processor 220 may activate the speech limiting function and, at the same time, may set the speech time limit range applicable in the corresponding chatroom to a second range.

In the chatroom in which the load amount is less than the first threshold and greater than or equal to the second threshold, a speech time limit of each member may be determined within the second range according to a level of participation.

When the load amount of the chatroom is less than the second threshold, the processor 220 may periodically and repeatedly check the load amount of the chatroom while maintaining an inactive state of the speech limiting function.

As a method of reducing load according to an increase in a load amount, the processor 220 may increase a speech time interval. That is, according to the increase in the load amount, a maximum value of the speech time limit range may increase. A maximum time of the first range is greater than a maximum time of the second range and a minimum time of the first range is greater than a minimum time of the second range. For example, the first range may correspond to a range from 100 seconds to 60 seconds and the second range may correspond to a range from 70 seconds to 30 seconds.

Figure 11:
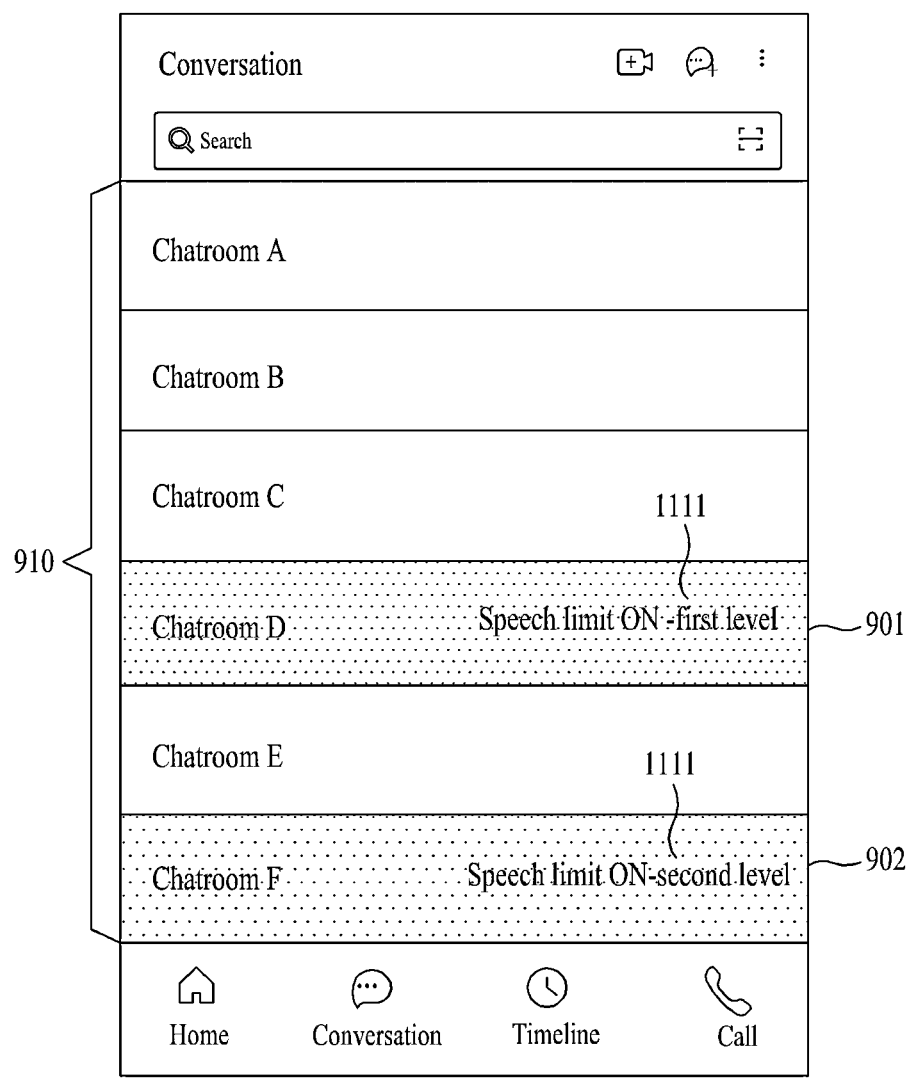
FIG. 11 illustrates an example of a screen for distinguishably displaying chatrooms in which speech limiting functions of different levels are activated in a chatroom list according to at least one example embodiment.

Referring to FIG. 11, when the speech limiting function is implemented using several stages, a level of the speech limit range may also be displayed in displaying speech limit state information 1111 on the chatrooms 901 and 902 in each of which the speech limiting function is activated in the chatroom list 910 of the chatroom list screen 900.

According to some example embodiments, it is possible to differentially apply a speech time limit based on a level of participation in a chatroom for each of members participating in the chatroom in a messaging-based social network service.

Also, according to some example embodiments, it is possible to automatically activate a speech limiting function of a corresponding chatroom according to a load amount of the chatroom and to differentially apply a speech limit range for each chatroom based on the load amount of the chatroom.

Therefore, it is possible to reduce a message transmission failure rate according to a message load of a chatroom and to improve readability of a message under the processing and communication resources of the given computer device(s) and network.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A message transmission limiting method performed by a computer device comprising at least one processor configured to execute computer-readable instructions included in a memory, the method comprising:
by the at least one processor,
calculating a participation score according to an activity related to a user in a chatroom;
setting a speech time limit for the user based on the participation score; and
limiting a message transmission of the user through the chatroom according to the speech time limit,
wherein the method further comprises differently setting, by the at least one processor, a time range settable as the speech time limit in the chatroom based on a load amount of the chatroom,
wherein a maximum value of the time range is set to increase as the load amount increases, and
wherein the speech time limit is set within the set time range.

2. The method of claim 1, wherein the calculating comprises calculating the participation score based on at least one of message transmission information of the user and response information from other users to the user or to a message transmitted from the user in the chatroom.

3. The method of claim 1, wherein the calculating comprises:
counting a number of message transmissions of the user in the chatroom;
counting a number of responses to a message transmitted from the user, the responses including at least one of a mention for the user and a reply, a comment, a reaction, capturing, keeping, and sharing; and
calculating the participation score based on the number of message transmissions and the number of responses.

4. The method of claim 1, wherein the setting comprises setting the speech time limit to decrease according to an increase in the participation score.

5. The method of claim 1, wherein
the setting comprises setting the speech time limit in correspondence with the participation score of the user or a score range to which the participation score of the user belongs.

6. The method of claim 1, wherein the limiting comprises controlling the message transmission according to a time interval corresponding to the speech time limit.

7. The method of claim 1, wherein the limiting comprises:
maintaining a state in which the message transmission is disallowed during the speech time limit after transmitting a previous message; and
switching to a state in which the message transmission is allowed when the speech time limit elapses.

8. The method of claim 1, further comprising:
checking the load amount of the chatroom; and
activating a speech limiting function that limits the message transmission through the chatroom based on the load amount.

9. The method of claim 8, wherein the checking comprises checking the load amount based on at least one of a number of members participating in the chatroom and a number of messages processible per unit time.

10. The method of claim 8, wherein the activating comprises automatically turning ON the speech limiting function when the load amount reaches a threshold.

11. A non-transitory computer-readable recording medium storing instructions that, when executed by a processor, cause a computer device to perform the method of claim 1.

12. A computer device comprising:
at least one processor configured to execute computer-readable instructions included in a memory,
wherein the at least one processor is configured to cause the computer device to,
calculate a participation score according to an activity related to a user in a chatroom,
set a speech time limit for the user based on the participation score,
limit a message transmission of the user through the chatroom according to the speech time limit,
differently set a time range settable as the speech time limit in the chatroom based on a load amount of the chatroom,
set a maximum value of the time range to increase as the load amount increases, and
set the speech time limit within the set time range.

13. The computer device of claim 12, wherein the at least one processor is configured to cause the computer device to,
count a number of message transmissions of the user in the chatroom,
count a number of responses to a message transmitted from the user, the responses including at least one of a mention for the user and a reply, a comment, a reaction, capturing, keeping, and sharing, and
calculate the participation score based on the number of message transmissions and the number of responses.

14. The computer device of claim 12, wherein the at least one processor is configured to cause the computer device to set the speech time limit to decrease according to an increase in the participation score.

15. The computer device of claim 12, wherein
the at least one processor is configured to cause the computer device to set the speech time limit corresponding to the participation score of the user or a score range to which the participation score of the user belongs.

16. The computer device of claim 12, wherein the at least one processor is configured to cause the computer device to control the message transmission according to a time interval corresponding to the speech time limit.

17. The computer device of claim 12, wherein the at least one processor is configured to cause the computer device to,
   maintain a state in which the message transmission is disallowed during the speech time limit after transmitting a previous message, and
   switch to a state in which the message transmission is allowed when the speech time limit elapses.

18. The computer device of claim 12, wherein the at least one processor is further configured to cause the computer device to activate a speech limiting function that limits the message transmission through the chatroom based on the load amount of the chatroom.

19. The computer device of claim 18, wherein the at least one processor is configured to cause the computer device to active the speech limiting function by,
   checking the load amount based on at least one of a number of members participating in the chatroom and a number of messages processible per unit time, and
   automatically turning ON the speech limiting function when the load amount reaches a threshold.

* * * * *